United States Patent [19]

Floyd et al.

[11] Patent Number: 5,615,626
[45] Date of Patent: Apr. 1, 1997

[54] PROCESSING OF MUNICIPAL AND OTHER WASTES

[75] Inventors: John M. Floyd, Upper Beaconsfield; Brian W. Lightfoot, Emerald, both of Australia

[73] Assignee: Ausmelt Limited, Victoria, Australia

[21] Appl. No.: 318,097

[22] Filed: Oct. 5, 1994

[51] Int. Cl.$^6$ .............................. F23G 5/00; A62D 3/00
[52] U.S. Cl. .......................................... 110/346; 588/201
[58] Field of Search .................................. 588/249, 201; 110/346, 341, 235, 237

[56] References Cited

U.S. PATENT DOCUMENTS

| | | |
|---|---|---|
| 2,647,045 | 7/1953 | Rummel. |
| 2,848,473 | 8/1958 | Rummel. |
| 2,923,260 | 2/1960 | Rummel. |
| 2,953,445 | 9/1960 | Rummel. |
| 3,527,178 | 9/1970 | Southwick. |
| 3,647,358 | 3/1972 | Greenberg. |
| 3,668,120 | 6/1972 | Patterson. |
| 3,706,549 | 12/1972 | Knuppel et al.. |
| 3,744,438 | 7/1973 | Southwick. |
| 3,812,620 | 5/1974 | Titus et al.. |
| 3,845,190 | 10/1974 | Yosim et al.. |
| 3,890,908 | 6/1975 | von Klenck et al.. |
| 3,974,784 | 8/1976 | Greenberg. |
| 4,017,271 | 4/1977 | Barclay et al.. |
| 4,043,766 | 8/1977 | Gernhardt et al.. |
| 4,140,066 | 2/1979 | Rathjen et al.. |
| 4,145,396 | 3/1979 | Grantham. |
| 4,187,672 | 2/1980 | Rasor. |
| 4,230,053 | 10/1980 | Deardorff et al.. |
| 4,244,180 | 1/1981 | Rasor. |
| 4,246,255 | 1/1981 | Grantham. |
| 4,346,661 | 8/1982 | Nakamura. |
| 4,388,084 | 6/1983 | Okane et al.. |
| 4,389,246 | 6/1983 | Okamura et al.. |
| 4,400,936 | 8/1983 | Evans. |
| 4,402,274 | 9/1983 | Meenan et al.. |
| 4,431,612 | 2/1984 | Bell et al.. |
| 4,432,344 | 2/1984 | Bennington et al.. |
| 4,447,262 | 5/1984 | Gay et al.. |
| 4,481,891 | 11/1984 | Takeshita et al.. |
| 4,574,714 | 3/1986 | Bach et al.. |
| 4,602,574 | 6/1986 | Bach et al.. |

(List continued on next page.)

FOREIGN PATENT DOCUMENTS

| | | |
|---|---|---|
| 51618/79 | 4/1980 | Australia. |
| 64453/90 | 4/1991 | Australia. |
| 0085153A1 | 8/1983 | European Pat. Off.. |
| 58-73742 | 5/1983 | Japan. |
| 59-27117 | 2/1984 | Japan. |
| 59-28505 | 2/1984 | Japan. |
| 2002995 | 11/1993 | Russian Federation. |
| WO90/00466 | 1/1990 | WIPO. |
| 02824 | 3/1991 | WIPO .................. 588/201 |
| WO91/05214 | 4/1991 | WIPO. |
| WO91/08023 | 6/1991 | WIPO. |
| WO92/01492 | 2/1992 | WIPO. |
| WO93/10862 | 6/1993 | WIPO. |
| WO94/22604 | 10/1994 | WIPO. |

*Primary Examiner*—Tamara L. Graysay
*Assistant Examiner*—Frederick Lagman
*Attorney, Agent, or Firm*—Oliff & Berridge

[57] ABSTRACT

The process provides for disposal of waste materials, including municipal waste such as garbage, industrial wastes, waste materials including rubber and plastics based materials, and ash waste from municipal waste incinerators and toxic waste incinerators. The waste is charged to a reactor, of a top-submerged lancing injector reactor system, containing a molten slag bath maintained in a turbulent condition, during charging of the waste, by top-submerged injection therein of a free-oxygen containing gas, using at least one top-submerged lance of the system. The waste is taken into the molten bath and is caused to circulate therein to a combustion/oxidation zone generated by the top-submerged injection. Constituents of the waste are subjected to free-oxygen of the injected gas in that zone and to heat energy of the slag, and thereby combusted/oxidised and/or decomposed.

25 Claims, 2 Drawing Sheets

U.S. PATENT DOCUMENTS

| | | | |
|---|---|---|---|
| 5,000,101 | 3/1991 | Wagner | 588/201 X |
| 5,177,304 | 1/1993 | Nagel | 588/201 |
| 5,191,154 | 3/1993 | Nagel | 588/201 |
| 5,251,879 | 10/1993 | Floyd et al. . | |
| 5,271,341 | 12/1993 | Wagner | 588/201 X |
| 5,301,620 | 4/1994 | Nagel et al. | 110/346 |
| 5,308,043 | 5/1994 | Floyd et al. . | |
| 5,322,547 | 6/1994 | Nagel et al. | 588/201 X |
| 5,395,405 | 3/1995 | Nagel et al. | 98/197 R |
| 5,396,850 | 3/1995 | Conochie et al. | 588/201 X |
| 5,436,210 | 7/1995 | Wilkinson et al. | 588/201 |

PROCESSING OF MUNICIPAL AND OTHER WASTES

This invention relates to a process for the disposal of waste materials, including municipal waste such as garbage, industrial wastes and specialised waste materials such as rubber and plastics based materials.

Existing processes for the disposal of waste material provide for combustion of such material, using either a moving grate or a rotary kiln incinerator. These processes allow air to come into contact with combustible constituents of the waste material under conditions causing those constituents to burn, producing a free-flowing solid ash and evolved combustion gases. Non-combustible constituents of the waste material, including those of inorganic compounds and metals, depending on the compounds and metals, may be oxidised if prevailing temperatures are sufficient, with these constituents or resultant oxidised material combining with the solid ash. Organic constituents in the waste, such as plastics, also may be burnt or oxidised to generate solid oxides in the ash, and gaseous products including CO, $H_2$, $H_2O$, $SO_2$, $H_2S$, HCl, HF and nitrogen oxides ($NO_x$).

The temperature prevailing in the moving grate and rotary kiln incinerators typically is in the region of 600° C. to 1000° C. The energy required to establish and maintain this temperature is provided partly by the fuel-value of the waste material; with the hydrocarbon content of the waste material usually providing the fuel-value. As this fuel-value usually is insufficient, a subsidiary fuel is added to and combusted with the waste material, or provided using a normal furnace burner by which the fuel is introduced. The fuel may be coat, oil or natural gas.

In addition to gaseous products as detailed above, the existing processes generate further gases by decomposition reactions involving the waste material. Depending on the nature of the waste material, these gases include hydrocarbons and can also include complex components such as furans, dioxins and polychlorinated biphenyls (PCBs). Also, carbon in the form of soot often is present in suspension in the gases. Incomplete decomposition and incomplete combustion results in the presence of HCl, HF and compounds such as furans, dioxins, and PCBs resulting in the product gases inevitably being highly toxic.

The product gases are subjected to further oxidation in a hot chamber afterburner by more air being introduced to that chamber to complete combustion of CO, $H_2$, hydrocarbons and carbon, to produce $H_2O$ and $CO_2$. Further fuel may be required in the afterburner but, because the reactions in the afterburner essentially are gas-gas reactions such as:

$$C+O_2=CO_2 \tag{1}$$

$$2CO+O_2=2CO_2 \tag{2}$$

$$2C_nH_m+2(n+\tfrac{1}{4}m)O_2=2nCO_2+mH_2O \tag{3}$$

the reactions are relatively slow and a large chamber volume is required for the afterburner. However, despite the use of an afterburner, the conditions in the incinerator and the afterburner am such that toxic compounds including furans, dioxins and PCBs may be formed and/or not destroyed.

In the existing processes, the product gases are cooled in a suitable reactor, after exiting from the afterburner. Thus, they may be cooled in a waste heat boiler or in a radiative and convective heat exchanger, or by an externally water-cooled system. The cooling occurs slowly and back-reactions involving formation of toxic compounds such as furans and dioxins can occur. Thee back-reactions am enhanced by a catalytic action of surfaces contacted by the gases during cooling. Prior to and during cooling, the gases are in an optimum temperature range for production of such toxic compounds for significant periods of time.

The product gases, when cooled, then may be subjected to filtration of solids and a scrubbing reaction in a suitable reactor and medium to remove toxic gas constituents including HCl, HF, $SO_2$ and $H_2S$. However, this is not 100% effective and some of those constituents, as well as toxic compounds including furans, dioxins and PCBs, and other toxic or noxious gaseous combustion products such as $NO_x$, enter the environment in discharged flue gases.

Incinerators are subject to environmental monitoring and limitations placed on both the gaseous discharges and solid waste products. In addition to the above-indicated difficulties with gaseous discharges, the solid products also contain toxic or noxious components. As previously indicated, the solid ash waste contains oxidised metals. Them always will be some level of toxic heavy metal oxides, such as $As_2O_3$, PbO, ZnO and $Sb_2O_3$, present in the ash. Moreover, the ash inherently has a very high surface area and, if it is allowed to come into contact with water, such as by being used as landfill and contacted by rain and/or ground water, the toxic heavy metals can be leached readily and enter the environment.

In addition to the above disadvantages of the existing processes, they involve high capital costs. Thus, while the equipment required is relatively simple, it necessarily is large in order to achieve a practical throughput, and costs are exacerbated by the necessity for an afterburner installation.

The present invention provides an improved process for the disposal of municipal and industrial waste. The waste may consist of or include municipal garbage containing organic and/or inorganic material, including domestic garbage and hospital wastes. Also, the waste may consist of or include a wide range of industrial waste, including compounds of various metals like Al, Cd, Cr, Cu, Fe, Mn, Pb and Zn, and metal scrap, articles and powders and metal containing pastes and sludges. The industrial waste also can include organic materials such as polychlorinated biphenyls, herbicides, pesticides and the like, as well as materials such as waste oil, inks, paints, solvents, resins and varnishes. The wastes additionally can include solid waste ash such as produced by the existing processes, as well as ash from municipal waste incinerators and toxic waste incinerators, and the present invention also can convert such waste to a more environmentally acceptable form. Moreover, the process of the invention enables the disposal of waste comprising specialised materials, including rubber based waste materials such as motor vehicle tires and plastics based materials such as vehicle battery cases.

In relation to waste comprising rubber or plastics based material, the invention provides a particular advantage. Like the other forms of waste specified, rubber and plastics based materials substantially comprise hydrocarbon compositions having a significant content of chemically bound carbon. However, they frequently also contain a significant proportion of particulate fillers, for example, free-carbon such as carbon black, rather than bound-carbon, and/or wood-flour, clay, talc, mica, metal powders or inert inorganic materials such as carbonates and oxides. Free-carbon simply enhances the fuel-value of the waste. Also, other fillers readily are able to be combusted/oxidised, and accommodated by the process.

In the process of the invention, the waste material is charged to a reactor of a top-submerged lancing injection reactor system. The reactor contains a molten slag bath which is maintained in a turbulent condition by top-submerged injection therein of a free-oxygen containing gas, using at least one top-submerged lance of the system. The waste is taken into the slag bath and is caused to circulate in the slag bath to a combustion/oxidation zone generated by the top-submerged injection. The waste is subjected to the free-oxygen content of the injected gas in the combustion/oxidation zone and the heat energy of the slag and thereby oxidised and/or decomposed. That is, the reactor system provides conditions in which the slag bath acts as a transfer medium or catalyst, for oxygen and heat energy transfer during combustion and decomposition of the waste.

Where the waste is in finely divided form, it can be injected into the slag bath at or adjacent to the combustion/oxidation zone by the lance providing top-submerged injection of free-oxygen containing gas. The waste can be entrained in that gas. Alternatively, if required, the waste can be supplied through a different passage of the lance to that providing oxygen, with the waste being entrained in an inert carrier gas such as nitrogen. In a further alternative, the waste can be supplied through a further lance of the system, such as with an inert entraining gas, either at or adjacent to the combustion/oxidation zone or at a location spaced from that zone.

Where the waste is in lump form, or is in a particulate form which is too coarse to be supplied via a lance, the waste can be charged to the slag bath through a feed port of the reactor. Most preferably, the reactor has a gas-lock feed chamber through which the waste is supplied to the feed port. However, in an alternative arrangement, the reactor has a waste feed system operable to force the waste directly into the slag bath through a siphon built into a side peripheral wall of the reactor.

At least while waste is being combusted in the reactor, the slag may be maintained at a temperature of from about 1100° C. to 1800° C., preferably from 1100° C. to 1400° C. Where the fuel-value of the waste is insufficient for this, a suitable fuel is supplied to the slag bath to maintain a temperature within that range. Suitable fuels include natural gas, fuel oil and coal. In the case of natural gas, fuel oil or particulate coal, the fuel can be injected into the slag bath via the lance used for top-submerged injection of oxygen-containing gas, or via another top-submerged injection lance. In the case of coal or fuel oil, the fuel can alternatively be added via a feed port or siphon of the reactor, such as the port used for the supply of waste. In the latter case, the coal can be in lump or particulate form and, if required, the coal or fuel oil can be mixed into, and supplied with, the waste.

Where the fuel-value of the waste exceeds that required for a slag bath temperature of from 1100° C. to 1800° C., such temperature can be maintained by appropriate control of the relative rates of supplying waste and fuel to the reactor, the rate of injecting, free-oxygen containing gas into the slag and/or by suitably reducing the free-oxygen content of the gas. However, it is preferable to maintain the supply of waste and fuel at rates providing an optimum throughput of waste, with injection of free-oxygen containing gas at a rate providing at least a stoichiometric free-oxygen equivalent to the fuel-value of the waste after allowance for oxygen required for combustion of fuel. In the latter case, it therefore can be necessary to extract or absorb heat energy from the slag bath so as to retain its temperature in the required range. Heat energy can be extracted by a water-cooled or steam-cooled heat exchanger which is positioned within the reactor and through which cooling water or steam is circulated from an external source. The heat exchanger preferably is able to be raised or lowered, as required. Also, heat energy can be extracted by spraying coolant water onto an outer, peripheral steel casing of the reactor or directly into the reactor. Additionally or alternatively heat energy can be absorbed within the slag bath by adding low-energy feed stock to the slag bath, such as slag-forming flux, or recycled slag after it is discharged from the reactor and granulated. Similarly, heat energy can be absorbed within the reactor by supplying water with the waste feed, whether this is added water or water present in suitable waste, such as pastes and sludges, added with other solid waste.

In the process according to the invention combustion/oxidation of the waste occurs principally in an upper region of the slag bath. The main reactions involved are reactions (1) to (3) detailed above with reference to the existing processes. The reactions proceed more efficiently and more completely in the process of the invention compared with the existing processes. However, some incompletely combusted gases and hydrocarbons, resulting from these reactions and from decomposition of constituents of the waste, can be evolved from the slag bath. To the extent that this is the case, the process of the invention in one form utilises after-burning or post-combustion of combustible evolved gases, in a reactor space above the slag bath, to achieve substantially complete oxidation of those gases within the reactor. The reactions involved, with representation of evolved hydrocarbons as methane for convenience of illustration, include:

$$2CO+O_2=2CO_2$$

$$2H_2+O_2=2H_2O$$

$$CH_4+2O_2=CO_2+2H_2O$$

Thus, all reactions take place in the reactor and gases leaving the reactor are substantially completely reacted to harmless materials such as $H_2O$ and $CO_2$. The conditions are such that substantially no complex molecular species such as furans, dioxins and PCBs remain in the gases.

Free-oxygen required for post-combustion may be provided by the gas supplied by top-submerged injection having a stoichiometric excess of free-oxygen, over oxygen requirements for combustion/oxidation of waste and fuel while that gas remains within the slag layer. In this case, some post-combustion can occur within the slag bath, but with a proportion of the excess free-oxygen being evolved from the bath to complete post-combustion above the slag bath. However, to maximise gas-gas mixing above the slag bath and, hence, the exposure of incompletely combusted gases and hydrocarbons to free-oxygen, it is preferred that the oxygen for post-combustion be supplied to the reactor space above the bath. The supply of free-oxygen above the bath can be by use of a separate lance or injector which supplies the oxygen directly into the reactor space. However, the oxygen preferably is directly supplied to that space by use of a lance as disclosed in PCT specification WO91/05214 (PCT/AU90/00466), corresponding to U.S. Pat. No. 5,251, 879 to Floyd and Australian patent 640955.

The lance disclosed in WO91/05214 enables top-submerged injection of free-oxygen containing gas into the slag bath, via a first elongate tube which extends through an elongate tubular shroud. The shroud defines a flow passage around and along the first tube, and terminates above the lower, discharge end of the first tube. With the discharge end of the first tube inserted into the slag bath for top-submerged injection of free-oxygen containing gas into the bath, the lower end of the shroud and the open lower end of the passage it defines are spaced above the top surface of the slag bath. Oxygen, or free-oxygen containing gas, is supplied to the passage, at the upper end of the lance, so as to flow along the passage and discharge, into the reactor space above the bath, from the open lower end of the passage. In addition to providing free-oxygen for post-combustion, the gas flow through the passage provides beneficial cooling of the lance.

It is desirable that the lance be adapted for water cooling of at least a main tube thereof, the first tube referred to in the immediately preceding paragraph herein, by which free-oxygen containing gas for top-submerged injection is supplied. For this purpose, the lance may be in accordance with U.S. Pat. No. 5,308,043 to Floyd et al, particularly as the lance disclosed in that U.S. patent also can be provided with a shroud which functions in accordance with the disclosure of WO91/05214. The use of a water-cooled lance has the benefits of further protecting the lance against the corrosive action of the molten slag and against thermal degradation, thereby facilitating top-submerged injection of pure oxygen, or air with a high level of oxygen enrichment, and use of high bath temperatures up to 1800° C.

Each of WO91/05214 and U.S. Pat. No. 5,308,043 is assigned to the assignee for the present application, and the disclosure of each is incorporated herein by reference.

Post combustion, even where occurring solely on the reactor space above the slag bath, results in a transfer of heat energy to the bath. Thus, in maintaining a required operating temperature of 1100° C. to 1800° C. in the slag bath, it is necessary to allow for this. However, post-combustion has the benefit of not only ensuring complete combustion/oxidation of evolved gases, but also of enabling fuel consumption to be minimised due to the transference of its heat energy to the slag bath.

The top-submerged injection of free-oxygen containing gas into the slag bath is to maintain the slag, in a turbulent condition. The turbulence is to be such as to cause pronounced splashing of the slag in a lower region of the reactor space above the bath. Such splashing most preferably is initiated prior to the top-submerged lance being lowered to a required position for injection in the bath, so that a lower extent of the lance becomes coated with splashed slag. The slag coating is solidified by the cooling effect of free-oxygen containing gas supplied through the lance, to thereby maintain a solid slag coating which protects the lance against the corrosive action of the molten slag and against thermal degradation. However, the splashing also maximises liquid-gas contact between the slag and gases in the reactor space above the bath and, hence, required completion of combustion/oxidation reactions. Post-combustion most preferably is achieved in the lower region of the reactor space in which the slag is caused to splash. The turbulence also serves to draw fresh waste charged to the reactor into the slag bath and its circulation therein to the combustion zone in the slag bath generated by the top-submerged injection of free oxygen containing gas supplied via the lance.

The free-oxygen containing gas which is injected by at least one top-submerged lance of the reactor system may be air oxygen, or oxygen-enriched air. Oxygen for post-combustion also may be air, oxygen or oxygen-enriched air. In each case, the gas preferably is oxygen, as this minimises generation of $NO_x$. Fuel, if required to supplement the fuel-value of the waste may, as indicated above, be natural gas, fuel oil and/or coal. Most preferably the fuel is injected into the slag bath through the lance, or at least one lance if them are two or more, providing top-submerged injection of free-oxygen containing gas. Such injection of the fuel facilitates it being concentrated at the combustion zone generated by the or each lance, with waste being caused to circulate to that zone by turbulence generated in the slag.

The slag of the bath is a silica-based slag, containing in solution at least one other oxide such as lime, magnesia, alumina, sodium oxide, potassium oxide, iron oxide and manganese oxide. The fluidity of the slag may be maintained at an appropriate level, to facilitate generation of turbulence and splashing, by control over its composition and, hence, its melting point relative to the required slag temperature of 1100° C. to 1800° C.

In the combustion/oxidation of wastes in accordance with the process of the invention, metal values in the waste will report in reactor gases or the slag, depending on the metals concerned. Volatile metals and/or oxides, such as Pb, Sb, As and Cd and/or their oxides am substantially fully volatilised and report in the gases, while some Zn or its oxide also can be volatilised. Any elemental vapour of these metals evolved will be oxidised in the gases by post-combustion. Non-volatile metals and their oxides, such as Fe and Al and remaining Zn, generally will be taken up in the slag bath as oxidic material. Also, any metal values present in the waste as glass initially will be melted and taken up by the slag bath, with the oxides of the metals either being retained in the bath or evolved, depending on the metals concerned.

Bound-carbon containing material in the waste, whether cellulose, ligno-cellulose, other waste comprising vegetable matter or animal matter, plastics and other hydrocarbon materials readily are able to be accommodated by the process of the invention. Depending on their nature, these forms of waste readily are able to be combusted/oxidised and/or caused to undergo decomposition reactions or thermal cracking. Such waste is retained in the slag bath until such effects reduce it to CO, $CO_2$, $H_2$, $H_2O$ and short-chain hydrocarbon gas products, or carbon soot, able to evolve from the bath.

The evolved gases such as CO, $H_2$ and short-chain hydrocarbons, as well as any soot, then is exposed to combustion/oxidation by post-combustion oxygen, essentially to yield $CO_2$ and $H_2$. However, if any halides are present in the waste, these typically will report in the gases as the hydrohalide vapour.

The process can be conducted in a batch operation, or it can be conducted on a continuous or semi-continuous basis. In a batch operation, successive charges of waste can be treated, allowing the volume of the stag bath to build-up until tapping is appropriate to reduce that volume back to an initial level. In a continuous operation, waste can be charged continuously to the reactor with slag tapped continuously. In a semi-continuous operation waste can be charged continuously, with the slag tapped from time to time as required. The tapped slag can be granulated and/or further processed such as for use in a building material, or for such engineering purposes as shot blasting. Alternatively, the slag can be granulated and used as land fill while, as previously indicted, at least some slag can be recycled to the reactor as low-energy feed stock for controlling the bath temperature. The slag is a glassy phase which is essentially non-porous, with the oxides in solution which lowers their activities. The slag is suitable for use as landfill or in building materials, as it is substantially inert to weathering and dissolution processes.

The reactor is closed against the egress of material, other than for a sealed or siphon feedhole, a closeable tapping-hob for tapping of slag, and an off-take flue for discharge of gases from the reactor space above the slag bath. Hot gases extracted via the flue are passed through a rapid cooling operation. This is to avoid any risk of reformation of deleterious molecular species, such as furans and dioxins, although such reformation is unlikely. The rapid cooling is to ensure there is insufficient time for the complex reactions involved, and to ensure that the gases are essentially free of such species.

Rapid cooling of the hot gases can be achieved in any suitable way, but preferably reduces their temperature to below about 300° C., such as from 150° C. to 300° C., in the shortest practical time. One convenient way in which the hot gases can be cooled is to pass the gases through a fine mist of water to achieve rapid evaporative cooling, with this having the benefit of taking water-soluble constituents such as HF and HCl into solution. An alternative is to pass the gases through a particulate bed of suitable material, such as sand or granulated slag, which forms a heat exchange medium of a fluid bed boiler system in which the particulate bed material is recirculated through a heat exchanger for cooling prior to being exposed to fresh hot gases. These quench cooling alternatives each serve to cool the gases quickly, such as to below about 300° C., to effectively preclude any further reactions between constituent gases.

After cooling, the gases then are able to be subjected to filtration, such as in an electrostatic precipitator or baghouse, to remove particulate fume. The fume contains mostly heavy metal oxides, such as PbO, ZnO and any $As_2O_3$ and $Sb_2O_3$, as well as any carbon soot. The filtered fume can be treated for metal recover by conventional means.

After filtration, the gas can be subjected to scrubbing reactions for removal of such acids as HF, HCl, $SO_2$ and $SO_3$, using conventional procedures. The resultant gas, substantially comprising $CO_2$ since any $H_2O$ will have condensed in the scrubbing operation, then can be safely discharged as it will be substantially free of any noxious and toxic compounds. In the latter regard, generation of $NO_x$ can be minimised by use of oxygen as the top-submerged injected and post-combustion gases. Also, any $NO_x$ generated despite this, or because of use of air or oxygen-enriched air instead of oxygen, can be substantially removed in the scrubbing operation.

The process of the invention provides numerous advantages over the existing processes. The top-submerged lancing injector reactor system is compact relative to that required for the existing processes, for a given rate of processing waste, while its capital and operating costs also are lower. Rather than simply producing an ash residue as in the existing processes, the process of the invention forms a slag product which, being a glassy phase, essentially encapsulates any ash produced and retains in solid solution any heavy metals which are not able to form a fume.

In the process of the present invention, most heavy metals are able to be removed in a fume product. The fume product is sufficiently enriched in such metals as to enable the product to be processed in metal recovery operations. In contrast, the existing processes are very much less efficient in forming a fume product of heavy metals and a substantial quantity of those metals are simply loosely incorporated in the difficult to handle ash residue.

The gaseous products produced by the process of the invention are able to be very low in, and usually essentially free of, toxic compounds such as furans, dioxines and PCBs. In contrast to the existing processes, this is able to be achieved by positive control, resulting from efficient combustion/oxidation by top-submerged injection in the reactor and post-combustion in the reactor. Also, while gases extracted via the off-take flue contain heavy metals and hydroxyhalides, these readily are able to be removed to a high level of efficiency to leave a dischargeable residual gas substantially free of toxic and noxious constituents. In this regard, the level of $NO_x$ can be minimised by use of oxygen, as indicated above, while $NO_x$ compounds present in the gases extracted via the off-take flue, despite use of oxygen or due to use of air or oxygen-enriched air, readily are able to be removed.

While the invention is applicable to waste which does not contain free-carbon, it equally is applicable to waste which does contain free-carbon as illustrated with reference to vehicle tyres and plastics products having carbon black as a filler. Where free-carbon is present, it enhances the fuel-value of the waste and thus reduces the need for use of coal, fuel oil or natural gas as a fuel. Also, other particulate fillers present in rubber and plastics material, such as detailed above, are able to be accommodated by the process. Such other fillers readily are able to be combusted/oxides or, depending on their composition, simply dissolved in the slag bath. Where combusted/oxidised, metal values from fillers are able to report in the evolved gases or the slag, depending on the metals concerned, while their other constituents such as $CO_2$ in the cases of carbonates, can report in the hot gases. Indeed, with plastics waste comprising vehicle battery cases, the process of the invention is such that it is capable of treating complete, exhausted vehicle batteries as the contents of a battery am able to be combusted/oxidised as for other waste.

The invention also is amenable to the recovery of waste heat energy, for use as required. Substantial waste heat energy is able to be recovered in cooling the generated hot gases extracted from the reactor via the off-take flue. Recovered waste heat energy can, if required, be used to pre-heat waste and/or gas used for top-submerged injection and/or post-combustion. Such use can be beneficial where, for example, the waste has a relatively low fuel-value, and minimises the level of fuel required for maintaining the required slag bath temperature. Also, particularly with waste having a high fuel-value, waste heat energy can be recovered from a heat exchanger used to prevent the slag bath temperature from exceeding such required temperature.

A further important advantage of the process of the invention arises from its production of a slag in which any toxic and noxious constituents are safely contained. Relative to waste treated, and also relative to the ash residue obtained with the existing processes, the volume of slag is able to be small. Thus, there is a substantial benefit obtainable in terms of volume reduction achieved by the process.

In order to further describe the process of the invention reference is made to the accompanying drawings, in which.

Figure 1:
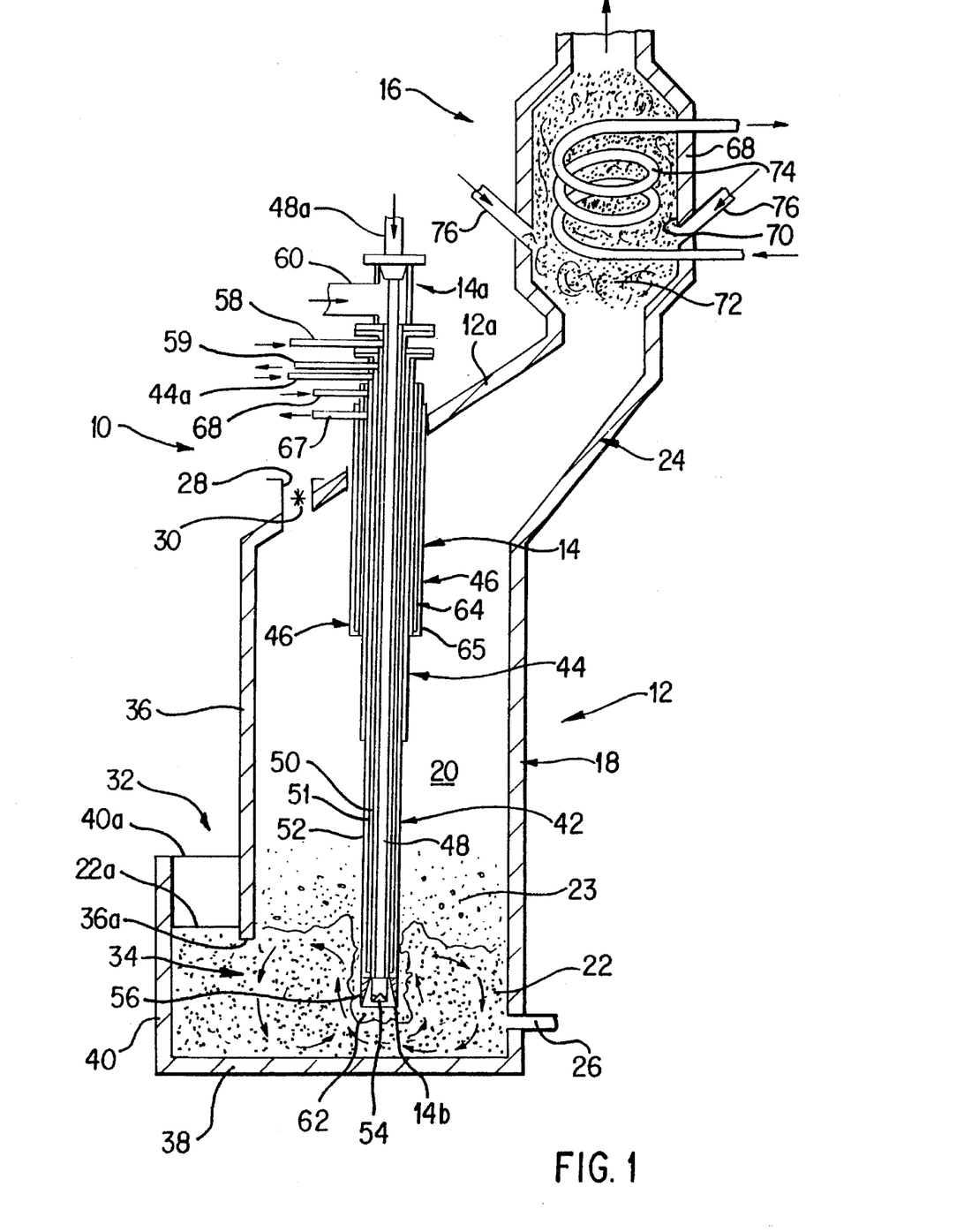
FIG. 1 shows a first embodiment of a top-submerged lancing injector reactor system suitable for conducting the process of the invention.

FIG. 1 shows a reactor system 10 having a reactor 12, a top-submerged injecting lance 14 and an off-gas cooling system 16. Reactor 12 comprises a refractory lined vessel 18, typically provided with an external steel shell. Vessel 18 defines a chamber 20 in which, during an operation therein, them is established a bath 22 of molten slag. Gases evolved during the operation pass into the gas space or volume of chamber 20 above bath 22, and are able to discharge via off-take flue 24. Reactor 12 has a normally closed tapping port 26 by which slag is able to be tapped from bath 22, when required. Also, reactor 12 has a feed port 28 in its roof 12a by which feed material is able to be charged to bath 22 under the control of a feed-valve 30. A gas-lock (not shown) is provided at port 28 to prevent egress of evolved gases therethrough.

In addition to port 28, reactor 12 also has a feed system comprising a siphon 32 located at one side thereof. Siphon 32 is permanently open such that an upper slag surface 22a of bath 22 is exposed. At the location of siphon 32, an opening 34 is formed in main peripheral wall 36 of vessel 18 such that the lower edge 36a of wall 36, at opening 34, is spaced above basal wall 38 of vessel 18. Across opening 34, vessel has an outer dam wall 40 which is joined to wall 36 to each side of opening 34 and projects upwardly from basal wall 38 to an upper edge 40a thereof located above edge 36a.

Lance 14 projects downwardly through an opening in roof 12a of reactor 12 at which there is a seal against egress of gases from chamber 20. A support system (not shown) is provided above reactor 12 and enables lance 14 to be raised and lowered as required. Lance 14, in the arrangement illustrated, is in accordance with U.S. Pat. No. 5,308,043 and has a main conduit system 42, as shroud pipe 44 and a supplemental cooling system 46.

Conduit system 42 extends from upper end 14a, to a lower discharge end 14b, of lance 14. System 42 has a central conduit 48 and, proceeding outwardly from conduit 48, three concentric conduits 50, 51 and 52. At end 14a, conduit 48 is adapted to receive particulate solids, such as fuel, and entraining gas received from a source via connector 48a. The solids are able to be dispersed at end 14b via a baffle 54 at the discharge end of conduit 48.

At end 14b of lance 14, conduits 50 and 52 are closed by a lance tip 56 which surrounds and co-operates with baffle 54. Conduit 51 terminates a short distance above tip 56 such that coolant water is able to circulate through system 42. Thus, water is able to be supplied at end 14a of lance 14, via connector 58, so as to flow down between conduits 50 and 51, and then across the top face of tip 56 for upwards between conduits 51 and 52 for discharge via connector 59. Also, at end 14a of lance 14, there is a connector 60 by which free-oxygen containing gas is able to be supplied for top-submerged injection. From connector 60, the gas flows downwardly between conduits 44 and 50, for discharge at end 14b through the annular diverging clearance between baffle 54 and tip 56, to provide a combustion/oxidation region 62 in bath 22, turbulence in bath 22 and generation of a zone 23 above the slag in which the slag was splashed.

Shroud pipe 44 extends from adjacent end 14a of lance 14 to a mid-height location spaced above discharge end 14b. Shroud pipe 44 defines around conduit system 42 an annular passage, which is open at its lower end. At its upper end, pipe 44 has a connector 44a by which free-oxygen containing gas is able to be supplied to the passage, for discharge exteriorly of lance 14 at the open lower end of the passage.

Cooling system 46 extends from adjacent end 14a of lance 14 along a major part of the length of shroud pipe 44. System 46 has an inner pipe 64 which is closed at its upper end around pipe 44, and an outer pipe 65 which is closed at its upper and around pipe 64 and at its lower end around pipe 44. A connector 66 enables the supply of cooling fluid for flow downwardly between pipes 64 and 44, and then upwardly between pipes 64 and 65 for discharge via a connector 67.

Off-gas cooling system 16 comprises a fluid bed boiler, such as that available from A. Ahlstrom Corporation under the trade mark FLUXFLOW. System 16 is mounted on the outlet of off-take flue 24 and includes a housing 68 which defines an enlarged section chamber 70. Hot gases exiting from reactor 12 discharge upwardly through housing 68 and serve to maintain a bed of particulate heat-exchange medium 72 in chamber 70 in a fluidised condition. The heat exchange medium extracts heat energy from the hot gases, while water or steam is circulated through a cooling coil 74 within chamber 70 to extract heat energy from the system. Cooled gases exit from the upper end of housing 68, and pass to a separator (not shown, but usually comprising a cyclone). Entrained solids are removed from the cooled gases by the separator, and are recycled to the fluidised bed in chamber 70 via conduits 76 or pass an ongoing processing operation.

In operation with reactor system 10, molten slag bath 22 is established with top-submerged injection of free-oxygen containing gas and fuel by lance 14. The slag is adjusted to a temperature of from 1100° C. to 1800° C., suitable for the waste to be treated, and to establish a substantial level of turbulence in bath 22. Preferably the slag is splashed to establish a coating of slag on at least the lower extent of conduit system 42, with the slag then solidified, to form a protective slag coating on lance 14, by injected gas and by coolant circulated through conduits 50, 51 and 52 of system 42.

With the slag at a suitable temperature and in a turbulent condition, waste to be treated, such as municipal and/or industrial waste, is charged to reactor 12. The waste can be charged via port 28 and/or via siphon 32.

Waste supplied via port 28 falls onto bath 22, and is drawn into the molten slag by the turbulence so as to be circulated to combustion/oxidation region 62 below end 14b of lance 14. Similarly, waste charged into siphon 32 is drawn into the molten slag and circulated to region 62 by the turbulence of the bath. At region 62, combustible components of the waste, such as hydrocarbon constituents are combusted, with evolution of gaseous reaction products and take-up of residual ash in the slag. Oxidisable constituents such as metals are oxidised. Oxidic constituents, such as metal oxides, as well as generated oxides, are either evolved into hot furnace gases or taken into solution by the slag.

During top submerged injection of free-oxygen containing gas into bath 22, via conduit system 42 of lance 14, free-oxygen containing gas is discharged via shroud pipe 44 into the gas space of chamber 20 above bath 22. As a consequence, combustible gases such as $H_2$, CO and hydrocarbons resulting from combustion/oxidation of waste are post-combusted, with resultant transfer of heat energy to bath 22. Also, any metal vapour evolved from bath 22 is oxidised.

The high temperatures of up to 1800° C. able to prevail in reactor 12. supplemented by post-combustion, ensures substantially complete combustion/oxidation of waste charged to reactor 12. Thus, hot gases passing to flue 24 substantially comprise $H_2O$, $CO_2$ and oxide fume, essentially free of toxic or noxious hydrocarbons such as furans, dioxins and PCB's. However, notwithstanding such high temperatures, the lance 14 is substantially protected against the corrosive action of the slag and thermal degradation. Such protection is achieved by the solid slag coating able to be maintained by the cooling effect of gases supplied for top-submerged injection and for post-combustion, as well as the cooling achieved by water circulated through conduit system 42 and coolant fluid circulated through cooling system 46.

Hot gases passing through flue 24 enter off-gas cooling system 16. Within chamber 70 of system 16, the incoming hot gases maintain heat-exchange medium 72 in a fluidised condition, prior to discharging out of the upper end of housing 68. Coolant water or steam is circulated through coil 74, to extract heat energy from chamber 70, with the hot gases being cooled by giving up heat energy to the fluidised medium 72 and the latter transferring the heat energy to coil 74. Thus the hot gases are rapidly cooled in chamber 70, preferably such that they discharge from housing 68 at a temperature below about 300° C.

Solids and fume in the hot gases entering system 16 are substantially fully absorbed by the fluidised medium 72. In particular, fume will tend to coat particles of the medium 72, while oxide vapour and any metal vapour will condense on those particles. A proportion of particles can tend to fall into reactor 12, generally with revolatilization of the coating. However, the particles, if not themselves volatilised, are able to be taken into solution in the slag, and a supply of make-up particles to chamber 70 therefore can be required. Also, some particles will discharge from the upper end of housing 68 due to entrainment in the cooled gases, but these are able to be recycled, if required.

The cooled gases pass from housing 68 via a conduit (not shown) to a separator, such as a cyclone, as indicated above. Entrained particles of medium 72 are able to be recycled to chamber 70, if required, via conduits 76. The cooled gases pass beyond the separator, after removal of entrained solids, and then are subjected to filtration and scrubbing operations, as detailed above.

Figure 2:
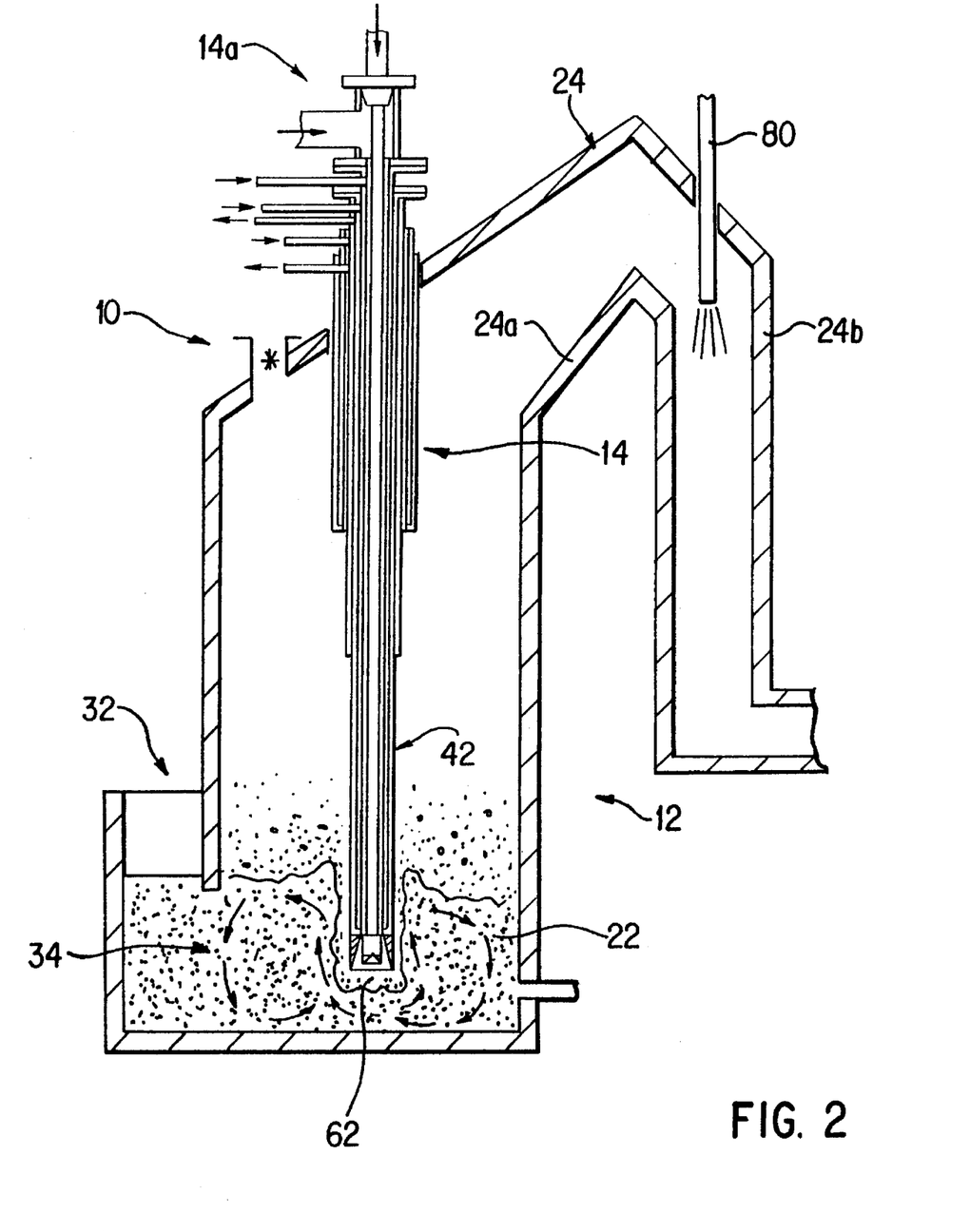
FIG. 2 shows a second embodiment of such reactor system.

Turning now to FIG. 2, the reactor system shown therein is similar in many respects to system 10 of FIG. 1. Thus, where relevant, the same reference numerals are used, and description is limited to matters of difference.

In system 10 of FIG. 2, the differences reside in the form of off-take flue 24 and in the arrangement for cooling hot gases passing to flue 24. As shown, flue 24 has an initial upwardly directed portion 24a as in FIG. 1, which leads to a down-turned portion 24b. Into portion 24b, them projects at least one spray conduit 80 which generates a cooling mist of water through which the hot gases pass to achieve rapid cooling. The cooling effect of the mist provides a similar effect as system 16 of FIG. 1 in achieving rapid cooling of the hot gases to below 300° C. The mist also condenses at least a proportion of the fume and oxide vapours, while it also takes into solution at least a proportion of any hydrohalides present in the hot gases.

Apart from the different method of achieving cooling of the hot gases, operation with system 10 of FIG. 2 is essentially the same as described with reference to the system of FIG. 1.

With the reactor of each of FIGS. 1 and 2, the free-oxygen containing gas which is injected into bath 22 by top-submerged injection through conduit system 42 of lance 14 may be air, oxygen-enriched air or oxygen. Preferably the gas is oxygen-enriched air or oxygen. Oxygen is most preferred as it minimises generation of $No_x$ and facilitates attainment of a required temperature for bath 22. The same applies to free-oxygen containing gas supplied, for post-combustion above bath 22, via shroud pipe 44.

Fuel supplied via central conduit 48 of lance 14 may be fuel oil, natural gas or particulate coal. However, in addition to, or as an alternative, fuel can be supplied via port 28. Port 28 enables lump coal to be used as a fuel, if required. Also, slag forming flux constituents, or make-up slag granules, can be charged via port 28, as required.

The top-submerged injection into bath 22 is to generate and maintain substantial turbulence in bath 22, as well as to generate combustion/oxidation region 62 below the discharge end 14b of lance 14. The turbulence is to be such as to cause waste material supplied via port 28 and/or via siphon 32 to be drawn into bath 22, for circulation therein to region 62. Preferably the turbulence is such as to cause splashing of slag from bath 22 into the post-combustion zone of chamber 20, to maximise liquid-gas contact between the slag and the gases, and transfer of heat energy to bath 22.

Turbulence generated in bath 22, within the periphery of wall 36 of vessel 18, extends to the portion of bath 22 located within siphon 32 between wall 26 and wall 40. Thus, the turbulence acts to draw in waste charged to reactor 12 at siphon 32. However, the turbulence preferably is not such as to generate splashing of slag at surface 22a of bath 22 in siphon 32. If required a feeder device, such as a feed screw, can be provided at siphon 32 to facilitate the charging of waste to reactor 12.

In order to further illustrate the process of the invention, description now is directed to the following Example.

EXAMPLE

Waste, comprising ash from an existing process toxic waste incinerator, was treated by smelting in a reactor in accordance with FIG. 2. The ash was derived from combustion of municipal waste and was mixture of ash solid and partially combusted/oxidised hydrocarbon, carbon and metal oxide content of finely divided, difficult to handle form.

A total of 500 kg of the ash was mixed with water in a pug mill for consolidation. It then was fed to the reactor through a rotary feeder at port 28 that provided a seal preventing the escape of furnace gases. The reactor contained a slag bath 22 which, in a quiescent condition, was 500 mm in diameter and 500 mm deep. However, prior to charging the moist ash waste, substantial turbulence was established in the bath by top-submerged injection by lance 14 which established a slag temperature of 1230° C. The top submerged injection was of free-oxygen containing gas comprising air, with the lance fired by injection of light oil as fuel. The rate of charging the air and oil was such as to provide an oxygen content sufficient for combustion of the oil, and for combustion/oxidation of constituents of the waste, with maintenance of the temperature of 1230° C. during charging and smelting of the waste.

The waste was charged and smelted over a 6 hour period. During this operation, 85 kg of steel swarf and 20 kg of lime were charged to the slag bath as flux. Gases evolved during smelting of the waste, by combustion/oxidation of constituents of the waste and combustion of the fuel, were subjected to post-combustion or after-burning in the reactor space above the slag bath. The post-combustion was by air discharged within that space, above the bath, via shroud pipe 44 of the lance 14. The volume of air supplied for post-combustion was such as to maintain a stoichiometric excess of oxygen over that required for complete post-combustion and maintenance of all metal values in the evolved gases in an oxidised state. The lower end of shroud pipe 44 was located close to the level of the slag surface when in a quiescent condition, such that post-combustion was in a region of the reactor space in which the slag was caused to splash by the turbulence generated by top-submerged injection.

Hot furnace gases generated during smelting were discharged from the reactor space via off-take flue portions 24a and 24b. In portion 24b of flue 24, the gases were cooled by generation of a water mist sufficient to cool the gases rapidly, by evaporative cooling, to about 150°. The water mist resulted in condensation of substantially all fume and other condensable or water soluble species, resulting in gas substantially comprising $CO_2$. The cooled gas then was subjected to filtration and scrubbing, leaving a final gas able to be discharged to the atmosphere.

A total of 530 kg of slag and 14 kg of fume were produced. The composition of the waste ash, the slag and the fume were:

|      | Waste Feed | Slag   | Fume  |
| ---- | ---------- | ------ | ----- |
| $SiO_2$ | 28%     | 26%    | 9.5%  |
| CaO  | 15%        | 17.6%  | 6.5%  |
| MgO  | 3%         | 2.8%   | 1.0%  |
| $Al_2O_3$ | 9%    | 8.4%   | 3.1%  |
| FeO  | 16%        | 40.2%  | 5.4%  |
| C    | 10%        | 0.05%  | 3.4%  |
| PbO  | 0.8%       | 0.07%  | 24.5% |
| ZnO  | 1.5%       | 0.28%  | 41.0% |
| CdO  | 0.04%      | 0.004% | 1.2%  |
| $As_2O_3$ | 0.03% | 0.003% | 0.9%  |
| Others | 16.6%    | 4.6%   | 3.4%  |

At the conclusion of smiting, the slag was tapped from the furnace, and granulated. The granulated slag was subjected to a toxic component leach procedure, and was found to meet all requirements for use of the slag as a building material, or for disposal for land fill.

Flue gases, after cooling, filtration and scrubbing, were found to be suitable for discharge to the atmosphere. The gases were found to have a negligible content of any metal values, or of hydrocarbons. While the waste ash had a significant toxic hydrocarbon content, the discharged flue gases were found to be essentially free of hydrocarbons, and not to have any detectable content of toxic constituents such as furans, dioxins and PCBs.

We claim:

1. A process for disposal of waste materials, comprising charging waste to a reactor of a top-submerged lancing injector reactor system, said reactor containing a molten bath consisting essentially of slag; and maintaining the molten bath in a turbulent condition during charging of the waste by top-submerged injection therein of a free-oxygen containing gas, using at least one top-submerged lance of the system, such that the waste is taken into the molten bath and is caused to circulate therein to a combustion/oxidation zone generated in the molten bath by the top-submerged injection, wherein constituents of the waste are subjected to the free-oxygen of the injected gas and to heat energy of the slag and are thereby destroyed substantially by at least one of combustion and oxidation.

2. The process of claim 1, wherein the waste is in finely divided particulate form and is injected into the molten bath at or adjacent to the combustion/oxidation zone.

3. The process of claim 1, wherein the waste is in lump form and is charged to the molten bath through a feed port of the reactor.

4. The process of claim 1, wherein the waste is forced directly into the molten bath through a siphon built into a side wall of the reactor.

5. The process of claim 1, wherein the molten bath is maintained at a temperature of from 1100° C. to 1800° C. while the waste is being charged to the reactor.

6. The process of claim 5, wherein the molten bath is maintained at a temperature of from 1100° C. to 1400° C.

7. The process of claim 6, wherein the free-oxygen containing gas is injected into the bath at a rate providing at least a stoichiometric free-oxygen equivalent to the fuel-value of the waste, and the temperature of the molten bath is maintained by extracting or absorbing heat energy from the molten bath.

8. The process of claim 5, wherein the waste has a fuel-value sufficient to enable maintenance of the temperature of the molten bath.

9. The process of claim 5, wherein the waste has a fuel-value which is insufficient for maintenance of the temperature of the molten bath, and wherein said process further comprises supplying a sufficient quantity of fuel to the slag of the molten bath during said top-submerged injection to maintain the temperature.

10. The process of claim 9, wherein the fuel is selected from natural gas, fuel oil, coal and combinations thereof.

11. The process of claim 9, wherein the free-oxygen containing gas is injected into the bath at a rate providing at least a stoichiometric free-oxygen equivalent to the fuel-value of the waste, after allowance for oxygen required for combustion of said fuel supplied to the reactor, and the temperature of the molten bath is maintained by extracting or absorbing heat energy from the molten bath.

12. The process of claim 5, wherein the temperature is maintained by charging waste at a controlled rate, and by injecting free-oxygen containing gas at a controlled rate and with a controlled content of free-oxygen.

13. The process of claim 1, further comprising supplying free-oxygen containing gas to a reactor space above the molten bath during said top-submerged injection of free-oxygen into said bath to achieve post-combustion or after-burning of gases evolved from the molten bath and maintenance of evolved oxide species in an oxidized state.

14. The process of claim 13, wherein the free-oxygen containing gas supplied to the reactor space above the molten bath is selected from air, oxygen-enriched air and oxygen.

15. The process of claim 13, wherein the free-oxygen containing gas supplied to the reactor space above the molten bath provides oxygen in excess of stoichiometric requirements for substantially complete post-combustion/after-burning.

16. The process of claim 13, wherein the free-oxygen containing gas supplied to the reactor space above the bath is provided through a shroud pipe of the at least one lance of the reactor system.

17. The process of claim 1, wherein the free-oxygen containing gas injected into the molten bath is selected from air, oxygen-enriched air and oxygen.

18. The process of claim 1, further comprising constraining hot gases resulting from combustion/oxidation of the waste and from any post-combustion/after-burning in a reactor space above the molten bath, whereby said hot gases discharge via an off-take flue of the reactor, and subjecting discharged hot gases to rapid cooling.

19. The process of claim 18, wherein the cooling reduces the hot gases to a temperature below about 300° C.

20. The process of claim 18, wherein said rapid cooling is achieved by evaporative cooling by passing said discharged hot gases through a water spray or mist.

21. The process of claim 18, wherein said rapid cooling is achieved by quench cooling the discharged hot gases in a fluid bed boiler system.

22. The process of claim 1, wherein the waste includes metal species selected from elemental metal and oxidic material, and wherein said process further comprises discharging volatilisable metal species from the reactor as fume and taking non-volatilised metal species into solution in the slag of the molten bath.

23. The process of claim 1, wherein the waste includes toxic organic compounds, and wherein said process further comprises substantially fully destroying said toxic organic compounds by thermal cracking to provide an off-take gas substantially free of toxic compounds.

24. The process of claim 23, wherein said toxic organic compounds are selected from the group consisting of furans, dioxins and PCBs.

25. The process of claim 1, wherein the waste material is selected from the group consisting of municipal waste, industrial waste, rubber based waste, plastic based waste, and ash waste.

\* \* \* \* \*